United States Patent [19]

Saegusa

[11] Patent Number: 4,882,133

[45] Date of Patent: Nov. 21, 1989

[54] METHOD FOR PRODUCING A FLAKY MATERIAL

[75] Inventor: Kunio Saegusa, Niihama, Japan

[73] Assignee: Sumitomo Chemical Company, Limited, Osaka, Japan

[21] Appl. No.: 302,128

[22] Filed: Jan. 26, 1989

Related U.S. Application Data

[63] Continuation of Ser. No. 163,203, Feb. 26, 1988, abandoned, which is a continuation of Ser. No. 23,374, Mar. 9, 1987, abandoned.

[30] Foreign Application Priority Data

Mar. 14, 1986 [JP] Japan .................................. 61-57924

[51] Int. Cl.$^4$ ............................................. C01G 23/04
[52] U.S. Cl. ..................................... 423/335; 423/593; 423/608; 423/610; 423/618; 423/625; 264/140; 428/403; 428/404
[58] Field of Search ............... 423/335, 593, 608, 610, 423/618, 625; 264/140; 428/403, 404

[56] References Cited

U.S. PATENT DOCUMENTS

| | | | |
|---|---|---|---|
| 2,941,895 | 6/1960 | Haslam | 105/193 J |
| 3,071,482 | 1/1963 | Miller | 428/403 |
| 3,767,443 | 10/1973 | Clark et al. | 106/291 |
| 3,799,886 | 3/1974 | Felice et al. | 502/350 |
| 3,937,797 | 2/1976 | Ramanski et al. | 502/350 |
| 4,166,147 | 8/1979 | Lange et al. | 501/126 |
| 4,224,189 | 9/1980 | Scholten et al. | 423/336 |
| 4,427,823 | 1/1984 | Inagaki et al. | 524/531 |
| 4,438,219 | 3/1984 | Brandenburg | 502/353 |
| 4,442,024 | 4/1984 | Crone, Jr. | 502/334 |
| 4,576,921 | 3/1986 | Lane | 423/338 |
| 4,650,895 | 3/1987 | Kadokura et al. | 423/598 |
| 4,704,374 | 11/1987 | Jacques | 423/335 |
| 4,810,415 | 3/1989 | Winkelbauer | 423/335 |

FOREIGN PATENT DOCUMENTS

| | | | |
|---|---|---|---|
| 1273230 | 11/1961 | France | 423/624 |
| 30-04731 | 7/1955 | Japan | 423/608 |
| 45-06424 | 3/1970 | Japan | 423/608 |
| 909084 | 10/1962 | United Kingdom | 423/624 |
| 2030587 | 4/1980 | United Kingdom | 106/291 |

OTHER PUBLICATIONS

*Journal of Polymer Science*, Vol. VII, No. 6, pp. 591–602 (1951), T. Boyd, "Preparation and Properties of Esters of Polyorthotitanic Acid".

*J. Oil Color Chemist's Assoc.*, Vol. 35, No. 379, pp. 28–30 (1952) Hancock et al., "Butyl Titanate in Heat Resisting Aluminum Paints".

Primary Examiner—Anthony McFarlane
Attorney, Agent, or Firm—Stevens, Davis, Miller & Mosher

[57] ABSTRACT

A method for producing flaky materials useful for improving, for example, a spreadability and luster of cosmetics and paints or improving mechanical characteristics of plastics, which comprises coating the liquid sol of metallic compounds onto a smooth surface to form a coated film; solidifying the said film into gel by means of heating, pH control, hydrolysis or vaporization-removal of a part of the dispersion medium; shrinking the volume of the said film by further vaporization-removal of the dispersion medium from the film; and then scraping off the flaky material from the smooth surface.

2 Claims, No Drawings

METHOD FOR PRODUCING A FLAKY MATERIAL

This application is a continuation of application Ser. No. 163,203, filed Feb. 26, 1988, now abandoned, which in turn is a continuation of Ser. No. 023,374, filed Mar. 9, 1987, now abandoned.

The present invention relates to method for producing flaky inorganic compounds. More particularly, it relates to a method for producing flaky materials easily and in large amounts from the liquid sol of metallic compounds.

Various flaky inorganic materials are well known. For example, flaky titanium oxide, flaky alumina, etc. are used, as incorporated in cosmetics and paints, to improve the spreadability and luster thereof, or they are used, as incorporated in plastics, for improvement in the mechanical properties thereof, other objects, etc. Like this, they are finding many applications.

There is known a method for producing the flaky material of titanium compounds by making the film of the compounds attached to a smooth substrate and removing the substrate by dissolution, crushing, etc. (Japanese Patent Publication No. 4731/1955). This method, however, has defects that operation is troublesome because of a necessity to dissolve the substrate, and also that it is difficult to obtain flaky materials having a uniform thickness so that to prepare the materials of the same size is very difficult.

There is also proposed a method for producing flaky materials by coating an organic solvent solution of titanium alkoxide or titanium tetrachloride onto a smooth surface and cracking the formed film by the action of steam (U.S. Pat. Nos. 2,941,895 and 3,071,482). Flaky inorganic materials composed mainly of titanium compounds can be obtained by these methods, but this method has defects that it is impossible to recover all the titanium compounds as flaky materials, and besides that flaky materials obtained in this manner are irregular in size and easy to take irregular curly forms.

In order to overcome the foregoing defects, there is proposed a method of coating an organic solvent solution of titanium compounds onto a substrate heated to a high temperature (Japanese Patent Publication No. 6424/1970). This method, however, has a defect that vaporization and boiling make the generation of extreme irregularity in thickness easy, and therefore that it is very difficult to control the thickness and size.

As described above, in the conventionally well-known methods for producing flaky materials, materials and equipment is expensive and the ability to produce cheap flaky materials does not exist.

An object of the present invention is to provide a method for producing flaky inorganic materials which, compared with the conventionally proposed methods, is capable of using cheap materials, can be easily mass produced with simple equipment and procedures, and produces homogeneous flaky materials.

That is, the present invention provides a method for producing flaky materials which comprises coating the liquid sol of metallic compounds onto a smooth surface to form a coated film; solidifying the said film into gel by means of heating, pH control or vaporization-removal of a part of the dispersion medium; shrinking the volume of the said film by further vaporization-removal of the dispersion medium from the film; and then scraping off the flaky material from the smooth surface. The present invention will be explained below in more detail.

In practicing the present invention, any of metallic compounds which form a sol in a suitable dispersion medium may be used. For example, there may be given metal oxides, metal hydroxides, metal sulfides, metal salts (e.g. metal chlorides, metal sulfates), organo-metal polymers, etc.

For the metal of metallic compounds used in the present invention, there may be given divalent or greater valent metals, preferably metals belonging to Groups IIIa, IVa or IVb of the periodic table, more preferably one or more members selected from the group consisting of aluminum, silicon, titanium, zirconium and tin. Specifically, there are given aluminum compounds such as alumina, aluminum hydroxide, aluminium sulfide, aluminum chloride, aluminum oxychloride, basic aluminum chloride, polyaluminum chloride, aluminum sulfate, aluminum acetate, aluminum oxalate, aluminum alkoxide polymers (e.g. aluminum isopropoxide polymer), alkylaluminum polymers (e.g. triethylaluminum polymer), etc.; silicon compounds such as silica, silicon oxychloride, silicon acetate, silicon oxalate, alkoxysilane polymers (e.g. tetraethylsilicate polymer), alkylchlorosilane polymers (e.g. dimethyldichlorosilane polymer), etc.; titanium compounds such as titania, titanium hydroxide, titanium sulfide, titanium oxychloride, titanium sulfate, titanium acetate, titanium oxalate, titanium alkoxide polymers (e.g. titanium isopropoxide polymer), titanium acetylacetonate, etc.; zirconium compounds such as zirconium oxide, zirconium hydroxide, zirconium sulfide, zirconium oxychloride, zirconium sulfate, zirconium acetate, zirconium oxalate, zirconium alkoxide polymers (e.g. zirconium isopropoxide polymer), zirconium acetylacetonate, etc.; and tin compounds such as tin oxide, tin hydroxide, tin sulfide, tin chloride, tin oxychloride, basic tin chloride, tin sulfate, tin acetate, tin oxalate, tin alkoxide polymers (e.g. tin isopropoxide polymer), alkylalkoxytin polymers (e.g. monooctyltributoxytin polymer), etc.

These metallic compounds are a liquid or solid at room temperature. Since they should be a liquid sol at the time of use, they are dispersed in suitable dispersion media such as water, organic solvents, etc. Among the sols of these metallic compounds, the sols of metal oxides or metal hydroxides and intermediate state of from metal hydroxides to metal oxides are preferred because such sols can be gelled by merely vaporization-removing the dispersion medium, as described later.

The dispersion medium used varies with the kind of metallic compounds, but the followings are preferably used: Water, alcohols (e.g. methanol, ethanol), aliphatic hydrocarbons (e.g. hexane, decane, cyclohexane), aromatic hydrocarbons (e.g. toluene, xylene), ketones (e.g. acetone), and mixed systems of these solvents.

The concentration of metallic compound sols varies also with the kind of metallic compound, which are not particularly limited. When the concentration is too low, however, the amount of dispersion medium to be vaporized becomes large, and the method is uneconomical. If the concentration is too high, processability becomes poor. Consequently, the sols are generally used in a concentration of from about 2 to about 50 wt. %.

Commercially available aqueous sols, include silica sols for example Ludox ® HS-40 (a trade name of E. I. du Pont Co.), etc., and alumina sols for example Alumina sol 100 (a trade name of Nissan Kagaku Kogyo Co.), etc. Further, as disperse systems in organic solvents, Methanol silica sol (a trade name of Nissan Kagaku Kogyo Co.), etc. are known.

For the preparation of these sols, for example silica sols, the following methods are known: Ion-exchange of water glass, neutralization of water glass with an acid, electro-dialysis of water glass, hydrolysis of ethylsilicate, etc. Also, for the preparation of alumina sols, hydrolysis of hydrolyzable compounds such as aluminum acetate by means such as heating, etc. is well known [For details, refer to Science of novel industrial materials, Silica and alumina (colloidal products), pp. 59–127; Chemical handbook (third revised edition), Application, pp. 132, edited by Nippon Kagakukai].

Further, when special sols are required, they can be prepared by the well-known methods described in the foregoing literature.

For stabilizing the sols, addition of proper pH-regulators, for example small amounts of hydrochloric acid, caustic soda or the like is effective.

In order to make the thickness of coating film uniform, the following may be added: Polymeric substances such as polyols, ethyl cellulose, etc.; high-boiling organic substances such as butyl cellulose, glycerin, etc.; nonionic or anionic surfactants, etc.

The well-known coloring matters comprising iron compounds, nickel compounds, vanadium compounds, chromium compounds, manganese compounds, etc. may also be added.

Metal oxide sols thus prepared are coated onto a smooth surface.

The material of the smooth surface varies with the condition of use, but materials resistant to the corrosive action of the sols are preferred. For such materials, there are given for example ceramic materials (e.g. glass, enamel), metallic materials (e.g. stainless steel, aluminum), polymeric materials (e.g. polyester, polyimide, nylon, polypropylene), etc.

The shape of the smooth surface include flat plates, rolls, belts, sheets, films, etc.

When belts, sheets or films are used, it is desirable to support them on supporting rolls or apply a definite tension to them in order to cause them to keep a smooth surface. For this purpose, the belts, sheets and films need to have enough strength to resist the tension and enough stiffness not to show extreme deformation under the tension. Consequently, the thickness of the belts, sheets and films is properly determined depending upon the material, and those having a required mechanical strength are used.

For the purpose of mass production, it is desirable to use endless belts or bulky rolls of sheet or film while unrolling them.

For coating the smooth surface, the well-known coating methods such as dipping, spraying, brushing, etc. may be used.

The mechanism of flaking is not yet clear enough, but the following observations may be considered: The coating film becomes a thin film by the removal of the dispersion medium from the metallic compound sol forming the coating film; gelation and then solidification of the thin film occur by further removal of the dispersion medium and reaction with water, acids, alkalis, etc.; and further vaporization of the disperse medium shrinks the volume of the solidified thin film to crack the film, and thus the thin film turns flake.

Vaporization-removal of the dispersion medium from the coating film may be carried out by previously heating the smooth surface itself, and when the smooth surface has the form of a roll, it may be carried out by heating the roll by passing a heating medium through the inside thereof. When belts, sheets or films are used, the vaporization-removal may be carried out by passing them through a heating zone wherein the liquid film of the sol is directly heated by hot air, electric or infrared heaters, high-frequency waves, etc. The heating temperature depends upon the vaporizability of the dispersion medium to be removed, so that it cannot be determined indiscriminately. Generally, however, a temperature of from room temperature to about 250° C. is suitable. For example, in the case of highly vaporizable dispersion media, it suffices to merely blow a room-temperature gas against the coating film.

Depending upon the kind of sol, the sol is gelled by merely heating. Examples of such sol, include titania sol and alumina sol.

Depending upon the kind of sol, the sol is gelled by merely vaporization-removing the dispersion medium to turn the film into flakes on the substrate. Examples of such sol, there are given sols of metal oxides (e.g. silica, alumina) or metal hydroxides and intermediate state of from metal hydroxides to metal oxides. When the sol is acidic or alkaline, it is gelled by reaction with an alkali or an acid respectively. The alkali used includes general-purpose alkalis such as ammonia, amines, caustic alkalis, etc. The acid used includes mineral acids, organic acids, $SO_x$, $NO_x$, etc. In carrying out this gelation with these alkalis or acids, when the alkalis or acids are of a gaseous form or mist form, the gelation is carried out by blowing them against the thin film. While when the alkalis or acids are contained in solvents, the gelation is carried out by dipping the thin film in the solution together with the substrate or applying the solution to the thin film.

The amount and concentration of these acids or alkalis vary with the kind of metallic sol and desired reaction rate, etc. Generally, however, when the sol is stable in a pH range of from 3 to 4, it is sufficient to add the alkali in amounts to change the pH of the sol from 9 to 10 after previous check by the beaker test, etc. When the sol is stable in a pH range of from 9 to 10, it is sufficient to add the acid in amounts to change the pH of the sol from 3 to 4.

Gelation of the sols of metal alkoxide polymers is carried out by hydrolysis with aqueous solutions containing an acid or alkali. Simultaneously with the gelation, the solvent is vaporized.

In stripping the flaky material from the smooth surface, when the substrate is a hard material such as metals, ceramics, etc., methods such as mechanical scraping with a scraper, stripping by ultrasonic waves, etc. are used. When the substrate is made of soft polymeric materials, stripping by ultrasonic waves is used, and when the smooth surface is flexible, stripping by bending the smooth surface is preferably used.

The flakes of metallic compounds thus produced are transparent and have a high luster, so that they can be used even as such. However, depending upon uses, they are finished into final products by calcination at a temperature of from about 200° to about 1100° C., preferably from 500° to 900° C.

This calcination converts the metallic compounds to mainly oxides. The flaky inorganic materials produced by the present invention are from about 0.01 to about 10 μm in thickness. However, depending upon intended uses, they are suitably crushed and used in a length of from about 1 to about 100 μm in general.

The method of the present invention described above in detail has advantages such that: Flaky metallic compounds which have optical effects (e.g. refractive index, luster) equivalent to those of the conventionally well-known supported-type pigments, can be stripped from the substrate very easily, and have a freely controllable very uniform size and a very smooth surface can be produced on simple equipment and by easy operation using cheap metallic compound sols.

The flaky inorganic materials obtained by the method of the present invention can be used as lustrous pigments for nail enamels, enamel, leather products, cosmetics, etc.; as nacreous pigments used as a filler for food-packing plastics; for coating exterior metals of automobiles; for producing pearl-glazed buttons by casting of unsaturated polyester resins, etc.

Also, because the flaky inorganic materials of the present invention have such characteristics that the content of impurities is low and various physical properties of flake such as size, thickness, refractive index, dielectric constant, etc. can be controlled industrially, flaky titanium oxide, flaky alumina, flaky silica, etc. are preferably used as extenders for cosmetics and fillers for paints and plastics. In addition to this, because of a further characteristic that the flaky materials have a good free-flowing property, flaky alumina is preferably used as powdery materials for producing tubes of sodium lamp, and flaky titanium oxide is preferably used as powdery materials for producing ceramics products such as condensers, porcelain, etc.

Further, flaky oxides can preferably be used as carriers for catalysts.

EXAMPLE 1

383 Grams (1 mole) of zirconium tetrabutoxide was uniformly dissolved in 847 g of butanol, and 90 g (5 moles) of water was mixed with this solution to prepare a sol. This sol was taken as a base liquid.

This liquid was placed in a breaker, and slide glass was dipped therein and pulled up at a rate of 75 cm/min. The slide glass was dried in an air bath at 90° C. for 30 minutes, and flakes on the slide glass were scraped off by means of a scraper and calcined at 900° C. for 30 minutes. The flaky zirconia thus obtained was $0.8\mu$ in thickness and from 10 to $30\mu$ in size.

EXAMPLE 2

Titanyl sulfate and sulfuric acid were mixed to prepare a solution having a titanium concentration of 0.25 mole/l and a sulfuric acid concentration of 0.9 mole/l. This solution was mixed with a 25 wt. % caustic soda solution with through stirring. The pH of the resulting solution was adjusted to 6 with an aqueous dilute caustic soda solution, and stirring was continued for 24 hours. Thereafter, sodium sulfate was removed by repeating centrifugation and dilution with water, and the titania concentration was adjusted to 2.8 wt. %. The titania sol solution thus obtained was taken as a base liquid.

This sol solution was placed in a beaker, and slide glass was dipped therein and pulled up at a rate of 250 cm/min. The slide glass was dried in an air bath at 90° C. for 30 minutes, and flakes on the slide glass were scraped off by means of a scraper and calcined at 900° C. for 30 minutes. The flaky titania thus obtained was from 8 to $40\mu$ in size and about $0.5\mu$ in thickness.

EXAMPLE 3

246 Grams (1 mole) of tributoxyaluminum was dissolved in 302 g of butanol, and 90 g (4 moles) of water was added and reacted to prepare a butanol sol of aluminum hydroxide. This sol was taken as a base liquid.

This sol was applied to a stainless steel roll of 10 cm in diameter rotating at 5 rpm and dried, and flakes on the roll were recovered by means of a scraper. The flakes were then calcined at 1200° C. to obtain flaky alumina of from 5 to $40\mu$ in size and of $1\mu$ in thickness.

EXAMPLE 4

260 Grams (1 mole) of stannic tetrachloride was dissolved in 2 kg of water, and a solution of 160 g (4 moles) of caustic soda in 1 kg of water was added dropwise thereto to prepare a tin oxide sol. Sodium chloride was removed from the sol by repeating centrifugation and dilution with water and then ion-exchange. The resulting sol was taken as a base liquid.

This liquid was placed in a beaker, and slide glass was dipped therein and pulled up at a rate of 75 cm/min. The slide glass was dried in an air bath at 90° C. for 30 minutes, and flakes on the slide glass were scraped off by means of a scraper and calcined at 900° C. for 30 minutes. The flaky tin thus obtained was $0.3\mu$ in thickness and from 5 to $20\mu$ in size.

EXAMPLE 5

A silica sol (Ludox®HS-40; produced by E. I. du Pont Co. was diluted with water so that the silica concentration was 20%, and the resulting sol was taken as a base liquid. This liquid was placed in a vat, and a roll of 10 cm in diameter was dipped therein at room temperature and rotated at a peripheral speed of 2 m/min. Thereafter, a 120° C. air was blown against the base liquid attached to the roll at a flow rate of 1 m/sec. Thus, water contained in the film of the base liquid was removed, and the gel-form film of silica was formed on the roll. On further removing water, volume shrinkage occurred to form cracks in the film and the film turned silica flakes. The flakes were scraped off by means of a scraper made of Swedish steel.

The flakes obtained were calcined at 600° C. to obtain flaky silica of from 10 to $25\mu$ in size and of $2\mu$ in thickness.

EXAMPLE 6

A silica sol with methanol as a dispersion medium (trade name, Methanol silica sol; produced by Nissan Kagaku Kogyo Co.) was adjusted so that the silica concentration was 5%, and the resulting sol was taken as a base liquid. This liquid was flaked on the same equipment as used in Example 5. The flakes obtained were calcined at 600° C.

Thus, flaky silica of from 3 to $25\mu$ in size and of $0.5\mu$ in thickness was obtained.

EXAMPLE 7

An alumina sol (Alumina sol 100; produced by Nissan Kagaku Kogyo Co.) was diluted with water so that the alumina concentration was 10%, and the resulting sol was taken as a base liquid. This liquid was placed in a beaker, and slide galss was dipped therein and pulled up at a rate of 60 cm/min. The slide glass was dried in an air bath at 90° C. for 30 minutes, and flakes on the slide glass were scraped off by means of a scraper and calcined at 900° C. for 30 minutes.

The flaky alumina thus obtained was from 8 to 50μ in size and about 2μ in thickness.

What is claimed is:

1. A method for producing flaky materials which comprises coating a smooth surface with an aqueous liquid sol of compounds, in a dispersion medium wherein said compounds are selected from the group consisting of oxides and hydroxides of one or more metals having a valence of 2 or more and belonging to Group IIIa, IVa and IVb of the Periodic Table and silica to form a coated film; solidifying the film into gel by means of removal of the dispersion medium by vaporization or by means of adjusting the pH; shrinking the volume of the said gel by further vaporization of the dispersion medium from the gel to produce flaky material; and then scraping the flaky material off the smooth surface.

2. A method for producing flaky materials according to claim 1, wherein the metal of said oxides and hydroxides of metal is one or more metals selected from the group consisting of aluminum, titanium and zirconium.

* * * * *